Patented Oct. 16, 1951

2,571,989

UNITED STATES PATENT OFFICE 2,571,989

NEUTRAL ESTERS OF THIOPHOSPHORIC ACID

Gerhard Schrader, Opladen-Bruchhausen, Germany, assignor to Farbenfabriken Bayer, Leverkusen, Germany No Drawing. Application November 17, 1950, Serial No. 196,353. In France September 28, 1949

4 Claims. (Cl. 260—461)

The present invention relates to the manufacture of neutral esters of thiophosphoric acid and to new esters of this series.

The new compounds correspond to the general formula:

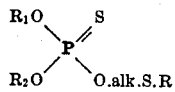

In this formula $R_1$ and $R_2$ stand for alkyl radicals which may be the same or different, and are preferably lower alkyl radicals such as methyl, ethyl or propyl. The radical designated "alk" in this formula stands for a straight or branched alkylene radical which may be interrupted by a hetero atom such as oxygen or sulfur; as examples may be mentioned methylene, ethylene, propylene, butylene, methyl-ethylene, methyl-propylene —$CH_2.CH_2.O.CH_2.CH_2$—,

—$CH_2.CH_2.S.CH_2.CH_2$— and so on. R in this formula means alkyl, hydroxyalkyl, aralkyl or aryl, e. g. methyl, ethyl, propyl, butyl, hexyl, hydroxy-ethyl; benzyl; phenyl, tolyl.

The new compounds are easily obtainable by reacting dialkyl chlorothiophosphates with sulfur containing alcohols of the formula HO.alk.S.R in which formula "alk" and R have the same meaning as stated above. The reaction of the dialkyl chlorothiophosphates with the said alcohols is performed either by using these alcohols in the form of their alkali salts or by reacting the alcohols as such in the presence of an acid binding agent, e. g. anhydrous sodium carbonate. Preferably the reaction is carried out in an inert diluent; hydrocarbons, such as benzene or its homologues etc., chlorobenzene and similar compounds, or ketones such as acetone, methyl ethyl ketone, methyl propyl ketone, may be mentioned. According to the reaction conditions the reaction is carried out at room temperature or slightly below this temperature up to temperatures of about 90 to 100° C. The reaction can catalytically be accelerated by adding some metallic copper. The reaction takes place according to the following equation:

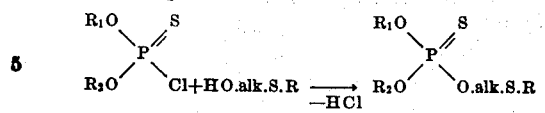

The new esters of thiophosphoric acid are, as a rule, oily liquids of high boiling point, and are distinguished by very good insecticidal properties, in particular by their systemic insecticidal properties.

The present invention is illustrated by the following examples; it is, however, not restricted thereto:

Example 1

12 grams of finely pulverized metallic sodium are suspended in 50 cc. of dry benzene. Into this suspension 50 grams of β-hydroxy-ethyl methyl sulfide of B. P. 72° C. under 6 mm. pressure (described in Journal of the American Chemical Society, volume 52 [1930], p. 2576) are dropped, and the temperature is maintained at 40 to 50° C. for half an hour. After this period the sodium is dissolved. The mixture is then cooled to 20° C., and 87 grams of dimethyl chlorothiophosphate (B. P. 38 to 39° C. under 2 mm. pressure) are added drop by drop at a temperature of 10 to 20° C. This temperature is kept with stirring for further two hours. 50 cc. of water are added for dissolving the salt, the aqueous layer is removed, and the benzene layer fractionated. 70 grams of O.O-dimethyl O-methylmercaptoethyl thiophosphate of B. P. 115° C. under 2 mm. pressure are obtained, corresponding to a yield of 64 per cent of theory. The product thus obtained is a colorless oil, which is slightly soluble in water and has a characteristic smell.

Example 2

12 grams of finely pulverized sodium are, as in Example 1, suspended in 50 cc. of benzene. Then 50 grams of β-hydroxy-ethyl methyl sulfide are added with stirring, and the mixture is heated for half an hour to a temperature of 40 to 50° C. until all sodium is dissolved. Then 95 grams of diethyl cholothiophosphate are added drop by drop with stirring, and the temperature is kept at 10° C. for 2 hours with further stirring. By working up the product thus obtained, 80 grams of O.O-diethyl O-methylmercapto-ethyl thiophosphate of B. P. 131 to 132° C. under 1 mm. pressure are obtained, corresponding to a yield of 65 per cent.

Example 3

110 grams of β-hydroxyethyl ethyl sulfide of B. P. 80° C. under 14 mm. pressure (described in Annalen der Chemie, volume 240 [1887], p. 310; Berichte der Deutschen Chemischen Gesellschaft, volume 65 [1935], p. 588) are dissolved in 200 cc. of toluene. To this solution 2 grams of copper powder and 110 grams of anhydrous sodium carbonate are added. While stirring, 190 grams of diethyl chlorothiophosphate are added at a temperature of 80 to 90° C., and this temperature is maintained with further agitation. Then the mixture is cooled to room temperature. The salts formed are dissolved by the addition of 100 cc. of water. The aqueous layer is removed. After distilling off the toluene, 193 grams of crude O.O-diethyl O-ethylmercapto-ethyl thiophosphate are obtained, corresponding to a yield of 75 per cent. The new ester is in the pure state a colorless, faintly smelling oil of B. P. 134° C. under 2 mm. pressure.

By the methods described in Examples 1 to 3, the following esters of thiophosphoric acid can be produced:

$(C_2H_5O)_2P(S)-O.CH_2.CH_2.O.CH_2.CH_2.S.C_2H_5$
B. P. 168° C. under 2.5 mm. pressure.

$(C_2H_5O)_2P(S)-O.CH_2.CH_2.S-\langle C_6H_4\rangle-CH_3$
B. P. 177° C. under 0.5 mm. pressure.

$(C_2H_5O)_2P(S)-O.CH_2.CH_2.S-\langle C_6H_5\rangle$
B. P. 177–178° C. under 2 mm. pressure.

$\langle C_6H_5\rangle-CH_2.S.CH_2.CH_2.O.P(S)(OC_2H_5)_2$
B. P. 180° C. under 1 mm. pressure.

$(C_2H_5O)_2P(S)-O.CH_2.CH_2$
$(C_2H_5O)_2P(S)-O.CH_2.CH_2$  (linked via S)
Not distillable.

$(C_2H_5O)_2P(S)-O-CH_2-CH_2$
$HO-CH_2-CH_2$  (linked via S)
Not distillable.

$n-C_3H_7.S.CH_2.CH_2.O.P(S)(OC_2H_5)_2$
B. P. 140–146° C. under 2 mm. pressure $n-C_4H_9.S.CH_2.CH_2.O.P(S)(OC_2H_5)_2$
B. P. 158–162° C. under 3 mm. pressure.

$n-C_6H_{13}.S.CH_2.CH_2.O.P(S)(OC_2H_5)_2$
B. P. 163–170° C. under 2 mm. pressure.

$C_2H_5.S.CH_2.CH(CH_3).O.P(S)(OC_2H_5)_2$
B. P. 135–140° C. under 2 mm. pressure.

$C_2H_5.S.CH_2.CH_2.CH_2.CH_2.O.P(S)(OC_2H_5)_2$
B. P. 150–155° C. under 3 mm. pressure.

Example 4

Young apple trees infested with aphides are sprayed with an aqueous solution containing 0.005 per cent of the following compound:

$(CH_3O)_2P(S)-O.CH_2.CH_2.S.CH_3$

Some of the aphides are killed already after a few hours. After 6 to 7 hours the trees are free from all aphides.

Example 5

Talc is ground with an active ingredient of the following formula:

$(C_2H_5O)_2P(S)-O.CH_2.CH_2.S.CH_3$ so that a 2 per cent mixture is formed. The said talc dust is distributed in Petri dishes in a thin layer. Flies are caged in these Petri dished and shaken. After 18 to 21 minutes all flies are killed.

Example 6

Potato plants infested with Colorado beetles and Colorado larvae are dusted with a talc dust prepared according to Example 5, containing 5 per cent of the following substance:

$(C_2H_5O)_2P(S)-O.CH_2.CH_2.S.C_2H_5$

After 8 to 10 hours all beetles and larvae are killed.

Example 7

An aqueous solution containing 0.05 per cent of the following compound:

$(C_2H_5O)_2P(S)-O.CH_2.CH_2.O.CH_2.CH_2.S.C_2H_5$ is sprayed on Cineraria infested with aphides. After several hours all aphides are killed.

Similar insecticidal effects are obtained by the other compounds shown in the table of Example 3 above.

I claim:

1. As new compounds neutral esters of thiophosphoric acid of the general formula:

$$\begin{array}{c} R_1O \\ R_2O \end{array} P \begin{array}{c} S \\ O.alk.S.R \end{array}$$

wherein $R_1$ and $R_2$ stand for lower alkyl radicals, alk stands for an alkylene radical, and R stands for one of the group consisting of alkyl, benzyl and phenyl radicals.

2. As new compounds neutral esters of thiophosphoric acid of the general formula:

$$\begin{array}{c} R_1O \\ R_2O \end{array} P \begin{array}{c} S \\ O.(CH_2)_x.S.R \end{array}$$

wherein R, R₁ and R₂ stand for lower alkyl radicals, and X is one of the integers 1 to 4.

3. As new compound the neutral ester of thiophosphoric acid of the formula:

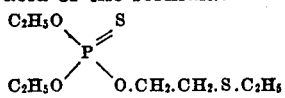

4. As new compound the neutral ester of thiophosphoric acid of the formula:

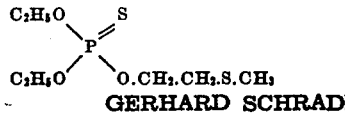

GERHARD SCHRADER.

REFERENCES CITED

The following references are of record in the file of this patent:

UNITED STATES PATENTS

| Number | Name | Date |
|---|---|---|
| 1,945,183 | Clemmensen | Jan. 30, 1934 |
| 1,982,903 | Clemmensen | Dec. 4, 1934 |
| 2,143,639 | Caprio | Jan. 10, 1939 |
| 2,371,631 | Lincoln et al. | Mar. 20, 1945 |